United States Patent [19]

Kalla et al.

[11] Patent Number: 4,834,801
[45] Date of Patent: May 30, 1989

[54] DIET DELIVERY SYSTEM

[75] Inventors: Elizabeth M. Kalla; Jerry L. Moyer, both of Kennedy Space Center, Fla.

[73] Assignee: The Bionetics Corporation, Kennedy Space Center, Fla.

[21] Appl. No.: 104,134

[22] Filed: Oct. 5, 1987

[51] Int. Cl.$^4$ .............................................. A01K 31/00
[52] U.S. Cl. .................................. 119/18; 119/51 FS
[58] Field of Search ..................... 119/18, 51 R, 51 FS

[56] References Cited

U.S. PATENT DOCUMENTS

| | | | |
|---|---|---|---|
| 2,026,334 | 12/1935 | Wilkinson | 119/51 R |
| 3,156,214 | 11/1964 | Denney et al. | 119/51 R |
| 3,738,329 | 6/1973 | Schweitzer | 119/18 X |
| 4,384,547 | 5/1983 | Mattox | 119/18 |

FOREIGN PATENT DOCUMENTS

| | | | |
|---|---|---|---|
| 621319 | 1/1935 | Fed. Rep. of Germany | 119/18 |
| 2505502 | 8/1975 | Fed. Rep. of Germany | 119/18 |
| 2513072 | 3/1983 | France | 119/51 R |

Primary Examiner—Robert Peshock
Assistant Examiner—R. Thomas Price
Attorney, Agent, or Firm—Larson & Taylor

[57] ABSTRACT

A diet delivery system for the controlled delivery of food to an animal particularly adapted to facilitate intake monitoring and maintain biocontainment capabilities while in microgravity is provided. The system includes a cage insert for an animal enclosure module having a diet servicing compartment adjacent an animal enclosing compartment. A diet housing unit is removably received in the diet receiving compartment and is held in place by a cover. The diet housing includes a housing aperture through which the animal feeds. A first barrier device is selectively movable to block the housing aperture or to allow feeding. A removable diet cassette is inserted in the diet housing and includes an aperture through which the animal feeds and a second barrier device selectively movable for blocking the cassette aperture or for allowing feeding. A diet container in which the food is stored is also provided together with a holding mechanism for releasably holding the diet container in the cassette.

13 Claims, 1 Drawing Sheet

DIET DELIVERY SYSTEM

FIELD OF THE INVENTION

The present invention relates generally to a diet delivery system for an animal enclosure, and more particularly to a diet delivery system for an animal enclosure module which provides a sterile, nutritionally complete and balanced diet in a manner that facilitates intake monitoring and maintains biocontainment capabilities while in microgravity.

BACKGROUND OF THE INVENTION

Rodents and other research animals are flown in space in animal module enclosures to provide model systems for studying the metabolic and physiological changes that occur when humans are exposed to microgravity. It is therefore important that investigators are confident that the changes which they see in these animals while in space are in fact due to microgravity, and not some other, unidentified condition(s). A nutritional deficiency, whether due to dietary inadequacy or insufficient intake, is one factor that could lead to experimental results which are difficult to interpret. This is especially significant since nutrient imbalances often mimic the response conditions encountered during space adaptation. For example, Gemini, Apollo, and Skylab astronauts consistently exhibited symptoms of altered calcium homeostasis.

In order to be assured that experimental results are not confounded, or masked, by nutritional deficiencies, investigators must therefor be assured that adequate intake of a nutritionally balanced diet (including water) is achieved by research animals. Previously flown flight hardware has been lacking in sufficient, quantitative intake monitoring capabilities. At times, daily intake had to be estimated by total consumption over the entire mission. Jammed feeders, and feed wastage due to crumbling of the hard food, effected reliability. Also, the use of natural ingredient diets minimized the ability to quantify, and/or control, the intake of single nutrients.

Additional problems with previously flown flight hardware include those of biocontainment of the housing system and diet sterility. The future of animal research in space was seriously jeopardized when animal by-products got into the cabin during a space flight. Biocontainment is thus a necessity for animal enclosure modules of this type.

SUMMARY OF THE INVENTION

In accordance with the present invention, a diet delivery system which supplies research rodents with a sterile, nutritionally complete and balanced diet in a manner which facilitates intake monitoring and maintains biocontainment capabilities while in microgravity is provided. An animal enclosure module has been modified to include a case insert which has an animal enclosing compartment and a diet servicing compartment adjacent to the animal enclosing compartment. An enclosure aperture is provided in a wall which separates the animal enclosing compartment from the diet servicing compartment. The diet servicing compartment includes an open top and a cover for the open top which is removably secured so as to cover the top in one position and to uncover the top in a second position. A diet housing unit is removably received in the diet receiving compartment and is secured in place by support bars and screws attached to the cage insert. The diet housing includes a housing aperture located adjacent to and in alignment with the enclosure aperture through which the animal feeds. A first barrier means is provided which is selectively movable between a first position for blocking the housing aperture and a second position for allowing feeding through the housing aperture. A removable diet cassette is inserted in the diet housing and includes a cassette aperture which aligns with the housing aperture and a second barrier means which is selectively movable for blocking the cassette aperture or for allowing feeding through the cassette aperture. A diet container for the food is positioned in the removable diet cassette by a suitable holding means.

In a preferred embodiment, the first barrier means includes a housing plate having an aperture therein and a housing track means provided adjacent an inside wall of the diet housing in which the housing plate is slidably received. With this construction, the housing plate is slidable between a first position where the housing plate blocks the housing aperture and a second position where the aperture in the housing plate aligns with the housing aperture. Similarly, the second barrier means includes a cassette plate having an aperture therein and a cassette track means provided adjacent an outside wall of the diet cassette. The cassette plate is thus slidable between a first position where the cassette plate blocks the cassette aperture and a second position where the aperture of the cassette plate aligns with the cassette aperture.

Preferably, the diet container is cylindrically shaped with a closed bottom and an open top which is held in alignment with and adjacent to the cassette aperture. The holding means for the diet container preferably includes a cavity shaped complimentary to the diet container in which the diet container is received and a removable cap or the like which presses against the bottom of the diet container to hold the diet container in place.

It is an object of the present invention to provide investigators with a diet delivery system for a research animal in which the food consumed by the animal can be carefully monitored to assure that the animal has an adequate intake of a nutritionally balanced diet.

It is also an object of the present invention to provide suitable barrier means on the removable diet cassettes and the animal enclosing compartment for closing the cassettes and compartments off during moving or changing of the cassettes to prevent any food debris or animal waste in the cassettes or compartments from escaping.

It is a further object of the present invention to provide diet cassettes which can be closed off after feeding in order to maintain the freshness of the food contained therein until required analyses can be completed.

Other features and objects of the present invention are stated in or apparent from a detailed description of a presently preferred embodiment of the invention found hereinbelow.

DETAILED DESCRIPTION OF THE PREFERRED EMBODIMENT

Figure 1:
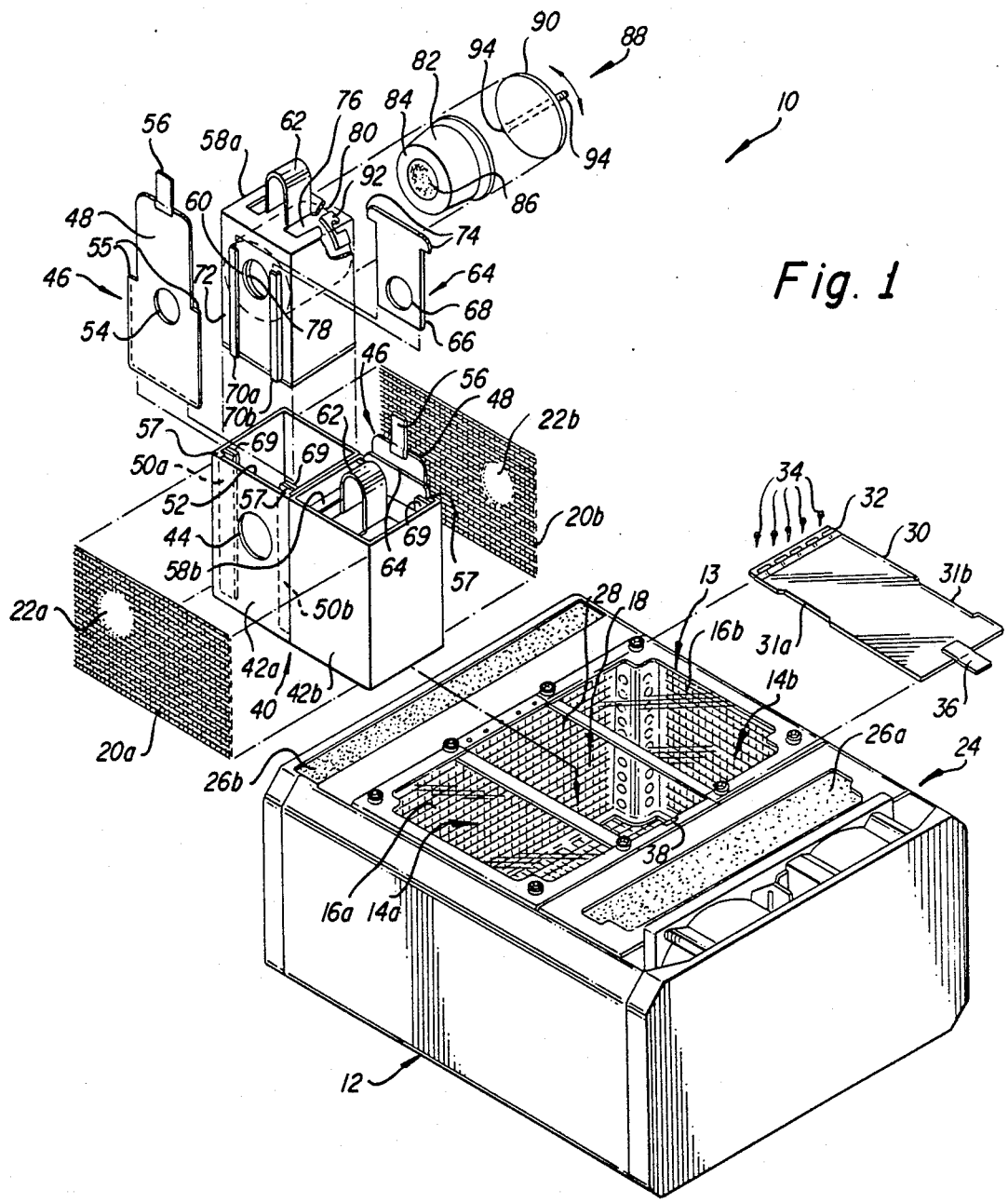
FIG. 1 is a schematic exploded perspective view of a diet delivery system according to the present invention.
Figure 2:
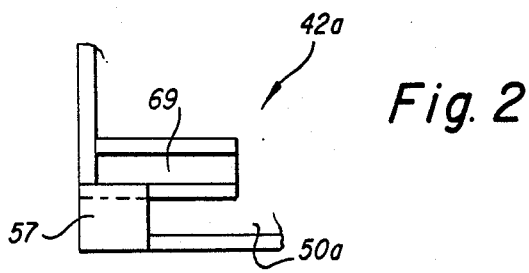
FIG. 2 is a schematic top plan view of a corner of the diet housing.

With reference now to the drawing in which like numerals represent like elements, a diet delivery system 10 is depicted in FIG. 1 for an animal enclosure module 12. Animal enclosure module 12 includes a cage insert 13 having two animal housing compartments 14a and 14b provided with transparent covers 16a and 16b. Provided between animal enclosing compartments 14a and 14b is a diet servicing compartment 18. Diet servicing compartment 18 is separated from animal enclosing compartments 14a and 14b by respective wire mesh walls 20a and 20b, which are depicted removed from cage insert 13 for clarity. Wire mesh walls 20a and 20b include respective feeding apertures 22a and 22b. Animal enclosure module 12 also includes a fan means 24 typically including four fans, a filter compartment 26a and a microbial filter 26b.

Diet servicing compartment 18 has an open top 28. Open top 28 is selectively closed by a transparent cover 30. Transparent cover 30 includes a hinge 32 at one end which is attached to cage insert 13 by suitable screws 34. At the other end, transparent cover 30 includes a tab 36 which is removably latchable to a latching means 38 provided on cage insert 13. Side cutouts 31a and 31b are also provided on cover 30 as shown.

Removably received in diet servicing compartment 18 is a diet housing 40. Diet housing 40 is separated vertically into two housing halves 42a and 42b. Each housing half 42a and 42b includes a housing aperture such as housing aperture 44 depicted in housing half 42a. Housing aperture 44 is positioned so as to be in alignment with feeding aperture 22a of wire mesh wall 20a when diet housing 40 is located in diet servicing compartment 18. Similarly, the housing aperture in housing half 42b is aligned with feeding aperture 22b.

In order to close or cover housing aperture 44, housing half 42a includes a first barrier means 46. First barrier means 46 includes a housing plate 48 and housing track means 50a and 50b attached to an inside wall 52 of housing half 42a. As schematically illustrated, housing plate 48 is received in housing track means 50a and 50b so as to be slidable along inside wall 52. Housing plate 48 includes a plate aperture 54 at about the middle thereof and a tab 56 extending from the upper end thereof. When housing plate 48 is pulled up in housing half 42a by use of tab 56, plate aperture 54 is located totally above housing aperture 44 so that housing plate 48 blocks or covers housing aperture 44 in this first position. For convenience, a suitable stop 57 is provided at the top of track means 50a and 50b to engage shoulders 55 of housing plate 48 to stop the raising of housing plate 48 when plate aperture 54 is completely above housing aperture 44. In this position, it should also be appreciated that tab 56 and the top of housing plate 48 extend through cutout 31a above cover 30. Then, housing plate 48 is lowerable all of the way down to a second position where plate aperture 54 aligns with housing aperture 44. In housing half 42b, first barrier means 46 is shown in position to block the corresponding housing aperture of housing half 42b.

Housing halves 42a and 42b are sized to receive respective removable diet cassettes 58a and 58b. As shown, diet cassette 58a includes a cassette aperture 60 which is positioned on diet cassette 58a so that when diet cassette 58a is located in housing half 42a, cassette aperture 60 aligns with housing aperture 44. In order to facilitate the insertion or removal of diet cassette 58a in housing half 42a, a handle 62 is provided at the top thereof.

In order to block or cover cassette aperture 60, a second barrier means 64 is provided. Second barrier means 64 includes a cassette plate 66 having a plate aperture 68 therein. Cassette track means 70a and 70b are provided on an outside wall 72 of diet cassette 58a. Cassette track means 70a and 70b allow cassette plate 66 to move vertically therebetween along outside wall 72. Cassette plate 66 is thus movable between a first position where plate aperture 68 is located below cassette aperture 60 so that cassette plate 66 blocks or covers cassette aperture 60, and a second position where plate aperture 68 is aligned with cassette aperture 60. A suitable catch 69 is provided at the top of housing track means 50a and 50b adjacent stop 57 to properly position cassette plate 66 at these two positions.

Conveniently, each catch 69 resiliently separates to trap respective ears 74 at the bottom thereof, and ears 74 are frictionally held there during a reverse movement. Thus, catch 69 resiliently engage ears 74 provided on cassette plate 64 to stop the movement of cassette plate 64 as diet cassette 58a is inserted in housing half 42a such that when diet cassette 58a is fully inserted cassette plate 64 is automatically in the second position (as depicted with diet cassette 58b). Then, as diet cassette 58a is withdrawn, catch 69 frictionally holds ears 74 until the tops of cassette track means 70a and 70b contact ears 74 and pull them free of catch 69, at which time cassette plate 64 is automatically in the first position.

Provided in diet cassette 58a is a diet receptacle 76. Diet receptacle 76 is substantially cylindrically shaped. Diet receptacle 76 includes a receptacle aperture 78 in alignment with cassette aperture 60 immediately therebehind. At the other end of diet receptacle 76, a rear opening 80 is provided.

Removably receivable in diet receptacle 76 is a diet container 82. Diet container 82 is shaped complimentary to diet receptacle 76, and as shown is cylindrically shaped. Diet container 82 includes a front circular aperture 84 which aligns with receptacle aperture 78 when diet container 82 is received in diet receptacle 76 (and a pull-off sealing tab (not shown) is removed). Diet container 82 also has a closed circular bottom so that food 86 for the animal is suitably retained in diet container 82.

In order to retain diet container 82 in diet receptacle 76, a suitable holding means 88 is provided. Holding means 88 includes a cap 90 which presses against the closed bottom of diet container 82 when diet container 82 is within diet receptacle 76. Cap 90 is held in place by a latching means including a pair of catch members 92 (only one of which is shown) and opposed catches 94 provided on cap 90. Catches 94 are retained in catch members 92 by simply twisting catches 94 slightly to lock catches 94 in place, and by reverse rotation to release catches 94.

It should be appreciated that housing halves 42a and 42b are of identical construction, but are oppositely directed in order to feed animals in respective animal enclosing compartments 14a and 14b. In addition, diet cassettes 58a and 58b are identical, with diet cassette 58b merely being turned to align cassette aperture 60 with feeding aperture 22b in wire mesh wall 20b. For convenience, the similar elements of diet cassettes 58a and 58b are identified with the same numerals.

It should be appreciated that the present diet delivery system 10 solves the problem of inadequate nutrient monitoring capabilities which includes a diet in a high moisture form. The food used utilizes semi-purified ingredients which allows for flexibility in formulation so that single nutrients, or nutrient ratios, can be altered as desired. The cohesive nature of the high moisture food also makes it ideal for use in microgravity since waste is minimized due to the food remaining intact.

Using such a food, diet delivery system 10 functions in the following manner. Initially, diet delivery system 10 is assembled with diet housing 40 located in diet servicing compartment 18 of cage insert 13 adjacent wire meshes 20a and 20b. In addition, diet cassettes 58a and 58b are located in respective housing halves 42a and 42b and suitable animals are located in animal enclosing compartments 14a and 14b. At this time, housing plate 48 is at the uppermost position and hence blocking housing aperture 44, while cassette plate 66 is in the uppermost position and hence not blocking cassette aperture 60. Diet container 82 is suitably located in diet cassette 58a and cover 30 is in the lower position with tab 36 latched to latching means 38 in order to hold diet housing 40 and diet cassettes 58a and 58b in place.

When it is desired to commence feeding, tab 56 of housing plate 48 is simply used to lower housing plate 48 all of the way down to a position where plate aperture 54 aligns with housing aperture 44. In this position, the animal is able to stick its head through feeding aperture 22a to feed on food 86 contained in diet container 82. It should be appreciated that cover 30 is maintained in the closed position at this time.

When it is desired to change diet container 82 in order to supply new food, housing plate 48 is returned to the upper position with shoulders 55 engaging stops 57 to block housing aperture 44 and cover 30 is moved from the closed position to the opened position. Then as diet cassette 58 is removed from housing half 42a using handle 62, ears 74 of cassette plate 66 remain engaged on catch 69 such that cassette plate 66 is automatically returned to the lower position to block cassette aperture 60 before ears 74 are pulled from catch 69 by engagement with the tops of cassette track means 70a and 70b. Finally, a new diet cassette 58a inserted in housing half 42a and cassette plate 66 is then automatically moved back to the uncovering position by catch 69 so that the animal can again feed through feeding aperture 22a when housing plate 48 is lowered after cover 30 is returned to the latched position.

It should be appreciated that while diet cassette 58a is being changed, there is no danger of any debris from animal enclosing compartment 14a escaping therefrom because housing plate 48 blocks housing aperture 44. Similarly, there is no danger of any debris or food escaping from diet container 82 because cassette plate 66 blocks cassette aperture 60.

It should also be appreciated that diet delivery system 10 requires minimum crew interaction to accurately monitor daily animal intake. Diet delivery system 10 has been specifically designed to function in environmental conditions similar to those found in the shuttle mid-deck during flight, and to provide sterile diet delivery while assuring that animals achieve ad-lib feeding.

It should further be appreciated that food sterility must be maintained and that diet delivery system 10 facilitates maintenance of diet sterility. Diet sterility must be maintained because microbial growth can cause nutrient degradation, loss of dietary consistency, decreased animal intake, and may potentially lead to toxin formation. All of these could adversely effect experimental results. With diet delivery system 10, nitrogen flushing, vacuum packaging, and irradiation of single or multiple diet servings in lightproof, tab sealed packages all are possible and thus contribute to a long shelf life of the food in diet container 82.

It should still further be appreciated that diet delivery system 10 is also usable for other applications. For example, diet delivery system 10 is usable for providing nutrients during animal transport, and for studies of diet modification for toxicology and/or pharmaceutical studies. The ability to maintain biocontainment also makes the system ideal for use in studies using contagious pathogens or toxic feed additives where one would need to protect the animal handlers.

The semi-purified, high moisture form food provides sufficient nutrients, including water, to support "normal" rat growth and/or maintenance and supplemental water sources are not required. The cohesive nature of this food further minimizes waste as well as making it desirable for use in many nutritional metabolic studies.

While all of the present invention has been described with respect to an exemplary embodiment thereof, it will be understood by those of ordinary skill in the art that variations and modifications can be effected within the scope and spirit of the invention.

I claim:

1. A diet delivery system for delivering food in a biocontained fashion to an animal in an animal enclosure module provided with a cage insert having a biocontained animal enclosing space and a diet servicing compartment adjacent thereto, said diet delivery system comprising:
   a diet housing which is received in the diet servicing compartment, said diet housing including a housing aperture through which the animal located in the enclosing space feeds;
   a first biological barrier means which is relatively movable between a first position for completely blocking said housing aperture to maintain biocontainment and a second position for allowing feeding through said housing aperture; and
   a removable biocontained diet cassette which is inserted in said diet housing, said diet cassette including
   (a) a cassette aperture which aligns with said housing aperture when said cassette is inserted in said diet housing,
   (b) a second biological barrier means which is relatively movable between a first position for completely blocking said cassette aperture to maintain biocontainment and a second position for allowing feeding through said cassette aperture,
   (c) a diet container in which the food is stored, and
   (d) a holding means for releasably holding said diet container in said cassette in position adjacent said cassette aperture for feeding.

2. A diet delivery system as claimed in claim 1 wherein said first barrier means includes a housing plate having an aperture therein and a housing track means provided adjacent an inside wall of said diet housing in which said housing plate is slidably received such that said housing plate is slidable between a first position where said housing plate blocks said housing aperture and a second position where said aperture of said housing plate aligns with said housing aperture.

3. A diet delivery system as claimed in claim 2 wherein said second barrier means includes a cassette plate having an aperture therein and a cassette track means provided adjacent an outside wall of said diet cassette in which said cassette plate is slidably received such that said cassette plate is slidable between a first position where said cassette plate blocks said cassette aperture and a second position where said aperture of said cassette plate aligns with said cassette aperture.

4. A diet delivery system as claimed in claim 3 and further including a catch means on said diet housing for automatically moving said cassette plate to the second position as said diet cassette is inserted in said diet housing and for automatically moving said cassette plate to the first position as said diet cassette is removed from said diet housing.

5. A diet delivery system as claimed in claim 1 wherein said diet container is cylindrically shaped and has a closed circular bottom which is parallel with an open circular top, and wherein said holding means holds said open top in alignment with and adjacent to said cassette aperture.

6. A diet delivery system as claimed in claim 5 wherein said holding means includes a cavity shaped complementary to said diet container in which said diet container is received, and a removable cap which presses against said bottom of said diet container.

7. A diet delivery system for controlled delivery of a food to an animal comprising:
a cage insert for an animal enclosure module having
 (a) an animal enclosing compartment,
 (b) a diet servicing compartment adjacent said animal enclosing compartment, said diet servicing compartment having an open top,
 (c) an enclosure aperture provided in a wall separating said animal enclosing compartment and said diet servicing compartment through which the animal feeds,
 (d) a cover for said open top of said diet receiving compartment, and
 (e) a securing means for removably securing said cover to said animal enclosure module such that said cover is movable between a first position covering said top and a second position where said top is uncovered; and
a diet housing unit which is removably received in said diet receiving compartment and held in place by said cover when said cover is in the first position, said diet housing including
 (a) a housing aperture located adjacent to and in alignment with said enclosure aperture through which the animal feeds,
 (b) a first barrier means which is relatively movable between a first position for blocking said housing aperture and a second position for allowing feeding through said housing aperture, and
 (c) a removable diet cassette which is inserted in said diet housing, said diet cassette including
  (i) a cassette aperture which aligns with said housing aperture when said cassette is inserted in said diet housing,
  (ii) a second barrier means which is relatively movable between a first position for blocking said cassette aperture and a second position for allowing feeding through said cassette aperture,
  (iii) a diet container in which the food is stored, and
  (iv) a holding means for releasably holding said diet container in said cassette in position adjacent said cassette aperture for feeding.

8. A diet delivery system as claimed in claim 7 wherein said first barrier means includes a housing plate having an aperture therein and a housing track means provided adjacent an inside wall of said diet housing in which said housing plate is slidably received such that said housing plate is slidable between a first position where said housing plate blocks said housing aperture and a second position where said aperture of said housing plate aligns with said housing aperture.

9. A diet delivery system as claimed in claim 8 wherein said second barrier means includes a cassette plate having an aperture therein and a cassette track means provided adjacent an outside wall of said diet cassette in which said cassette plate is slidably received such that said cassette plate is slidable between a first position where said cassette plate blocks said cassette aperture and a second position where said aperture of said cassette plate aligns with said cassette aperture.

10. A diet delivery system as claimed in claim 9 and further including a catch means on said diet housing for automatically moving said cassette plate to the second position as said diet cassette is inserted in said diet housing and for automatically moving said cassette plate to the first position as said diet cassette is removed from said diet housing.

11. A diet delivery system as claimed in claim 9 wherein said diet container is cylindrically shaped and has a closed circular bottom which is parallel with an open circular top, and wherein said holding means holds said open top in alignment with and adjacent to said cassette aperture.

12. A diet delivery system as claimed in claim 11 wherein said holding means includes a cavity shaped complementary to said diet container and in which said diet container is received, and a removable cap which presses against said bottom of said diet container.

13. A diet delivery system as claimed in claim 8 wherein said cover includes a cutout through which a top of said housing plate extends whereby said housing plate is raisable and lowerable while said cover is in the first position.

* * * * *